(12) United States Patent
Noguchi et al.

(10) Patent No.: US 11,254,250 B2
(45) Date of Patent: Feb. 22, 2022

(54) VEHICLE SEAT WITH VIBRATION TRANSFERRING MEMBER

(71) Applicants: TACHI-S CO., LTD., Tokyo (JP); CLARION CO., LTD., Saitama (JP)

(72) Inventors: Kazuo Noguchi, Tokyo (JP); Ryo Kurobe, Tokyo (JP); Masao Komada, Saitama (JP); Naoki Takada, Saitama (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 16/159,833

(22) Filed: Oct. 15, 2018

(65) Prior Publication Data
US 2019/0118684 A1 Apr. 25, 2019

(30) Foreign Application Priority Data
Oct. 20, 2017 (JP) .............................. JP2017-203547

(51) Int. Cl.
*B60N 2/90* (2018.01)
*B60N 2/58* (2006.01)
*A47C 7/18* (2006.01)
*A47C 7/02* (2006.01)

(52) U.S. Cl.
CPC ................ *B60N 2/90* (2018.02); *A47C 7/029* (2018.08); *A47C 7/18* (2013.01); *B60N 2/5816* (2013.01); *B60N 2/5825* (2013.01); *B60N 2002/981* (2018.02)

(58) Field of Classification Search
CPC .. B60N 2/5816; B60N 2002/981; B60N 2/90; B60N 2/5825
See application file for complete search history.

(56) References Cited

U.S. PATENT DOCUMENTS

| | | | | | |
|---|---|---|---|---|---|
| 3,961,823 | A | * | 6/1976 | Caudill, Jr. | .......... B60N 2/5825 297/452.6 |
| 4,317,591 | A | * | 3/1982 | Ramsey | ............... B60N 2/5825 297/452.6 |
| 4,695,091 | A | * | 9/1987 | Altmann | .................. B60N 2/58 219/217 |

(Continued)

FOREIGN PATENT DOCUMENTS

| CN | 101416829 A | 4/2009 |
|---|---|---|
| CN | 203987111 U | 12/2014 |

(Continued)

OTHER PUBLICATIONS

Dec. 9, 2020, Chinese Office Action issued for related CN Application No. 201811222262.7.

*Primary Examiner* — David R Dunn
*Assistant Examiner* — Tania Abraham
(74) *Attorney, Agent, or Firm* — Paratus Law Group, PLLC (57) ABSTRACT

A vehicle seat includes: a cushion pad in which one or more hanging grooves into which a trim cover is inserted are formed in a sitting-person supporting surface; a wire which is provided in a bottom of the hanging groove along the hanging groove and locks the trim cover which is inserted into the hanging groove; a vibration transferring member which is buried in the cushion pad along the wire; and a vibration body which excites the vibration transferring member.

4 Claims, 5 Drawing Sheets

(56) References Cited

U.S. PATENT DOCUMENTS

| | | | |
|---|---|---|---|
| 7,369,042 B2* | 5/2008 | Osaka | B60Q 9/006 340/435 |
| 7,635,163 B2* | 12/2009 | Lefranc | B60R 11/02 297/217.3 |
| 7,681,949 B2* | 3/2010 | Nathan | B06B 3/00 297/217.3 |
| 8,511,754 B2* | 8/2013 | Leponce | B60N 2/002 297/180.12 |
| 8,814,262 B2* | 8/2014 | Abe | A47C 7/74 297/180.11 |
| 8,919,878 B2* | 12/2014 | Sakamoto | B60N 2/5825 297/218.1 |
| 8,991,934 B2* | 3/2015 | Sei | B60N 2/5825 297/452.59 |
| 9,004,589 B2* | 4/2015 | Rockwell | B60N 2/002 297/217.3 |
| 9,409,499 B2* | 8/2016 | Funaki | B60N 2/2893 |
| 2002/0117882 A1* | 8/2002 | Takezawa | B60N 2/5825 297/218.1 |
| 2007/0241595 A1 | 10/2007 | Nathan et al. | |
| 2009/0140569 A1 | 6/2009 | Mashimo | |
| 2009/0227913 A1* | 9/2009 | Moriyama | B60N 2/90 601/49 |
| 2013/0307302 A1* | 11/2013 | Rockwell | B60N 2/7017 297/217.3 |
| 2014/0346823 A1* | 11/2014 | Stebbins | B60N 2/986 297/217.1 |
| 2014/0375105 A1 | 12/2014 | Okugawa et al. | |
| 2015/0108806 A1 | 4/2015 | Nagayasu et al. | |
| 2015/0307000 A1 | 10/2015 | Kozaki et al. | |
| 2015/0307002 A1 | 10/2015 | Kozaki et al. | |
| 2015/0307003 A1 | 10/2015 | Kozaki | |
| 2017/0008433 A1 | 1/2017 | Shiotsu | |
| 2018/0170228 A1 | 6/2018 | Kono | |

FOREIGN PATENT DOCUMENTS

| | | | |
|---|---|---|---|
| CN | 104553896 A | 4/2015 | |
| CN | 104999947 A | 10/2015 | |
| CN | 105015390 A | 11/2015 | |
| CN | 105034884 A | 11/2015 | |
| CN | 106335418 A | 1/2017 | |
| CN | 107105903 A | 8/2017 | |
| EP | 2003923 A2 * | 12/2008 | H04R 1/028 |
| JP | 2009-120015 A | 6/2009 | |
| JP | 2017-019386 A | 1/2017 | |
| JP | 2017-065643 A | 4/2017 | |

* cited by examiner

VEHICLE SEAT WITH VIBRATION TRANSFERRING MEMBER

CROSS-REFERENCE TO RELATED APPLICATION(S)

This application is based upon and claims the benefit of priority from Japanese Patent Application No. 2017-203547, filed on Oct. 20, 2017, the entire contents of which are incorporated herein by reference.

BACKGROUND

1. Field of the Invention

The present invention relates to a vehicle seat.

2. Description of the Related Art

In a seat mounted in a vehicle such as an automobile, there is known a seat in which a vibration body is arranged between a cushion pad and a trim cover covering the cushion pad, and information on a lane departure, an approach of an obstacle, or the like is transmitted to a sitting person through a vibration (for example, see JP-A-2009-120015).

There is also known a seat in which a vibration transferring member which is excited by the vibration body is buried in the cushion pad so as to reduce a sense of irritation Which the vibration body gives to the sitting person (for example, see JP-A-2017-19386 and JP-A-2017-65643).

By the vibration transferring member being buried in the cushion pad, the sense of irritation which the vibration transferring member gives to the sitting person can be reduced.

However, there is a concern that for the vibration is absorbed by the cushion pad, the vibration is hardly transferred to the sitting person.

SUMMARY

The invention has been made in consideration of the above situation, and an object thereof is to provide a vehicle seat in which a sense of irritation which is given to a sitting person can be reduced, and a vibration can be transferred to the sitting person excellently.

According to an aspect of the invention, there is provided a vehicle seat including: a cushion pad in which one or more hanging grooves into which a trim cover is inserted are formed in a sitting-person supporting surface; a wire which is provided in a bottom of the hanging groove along the hanging groove and locks the trim cover which is inserted into the hanging groove; a vibration transferring member which is buried in the cushion pad along the wire; and a vibration body which excites the vibration transferring member.

According to another aspect of the invention, there is provided a vehicle seat including: a cushion pad in which one or more hanging grooves into which a trim cover is inserted are formed in a sitting-person supporting surface; a wire which is provided in a bottom of the hanging groove along the hanging groove and locks the trim cover which is inserted into the hanging groove; and a vibration body which excites the wire.

According to the invention, the vehicle seat can be provided in which the sense of irritation which is given to the sitting person can be reduced, and the vibration can be transferred to the sitting person excellently.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
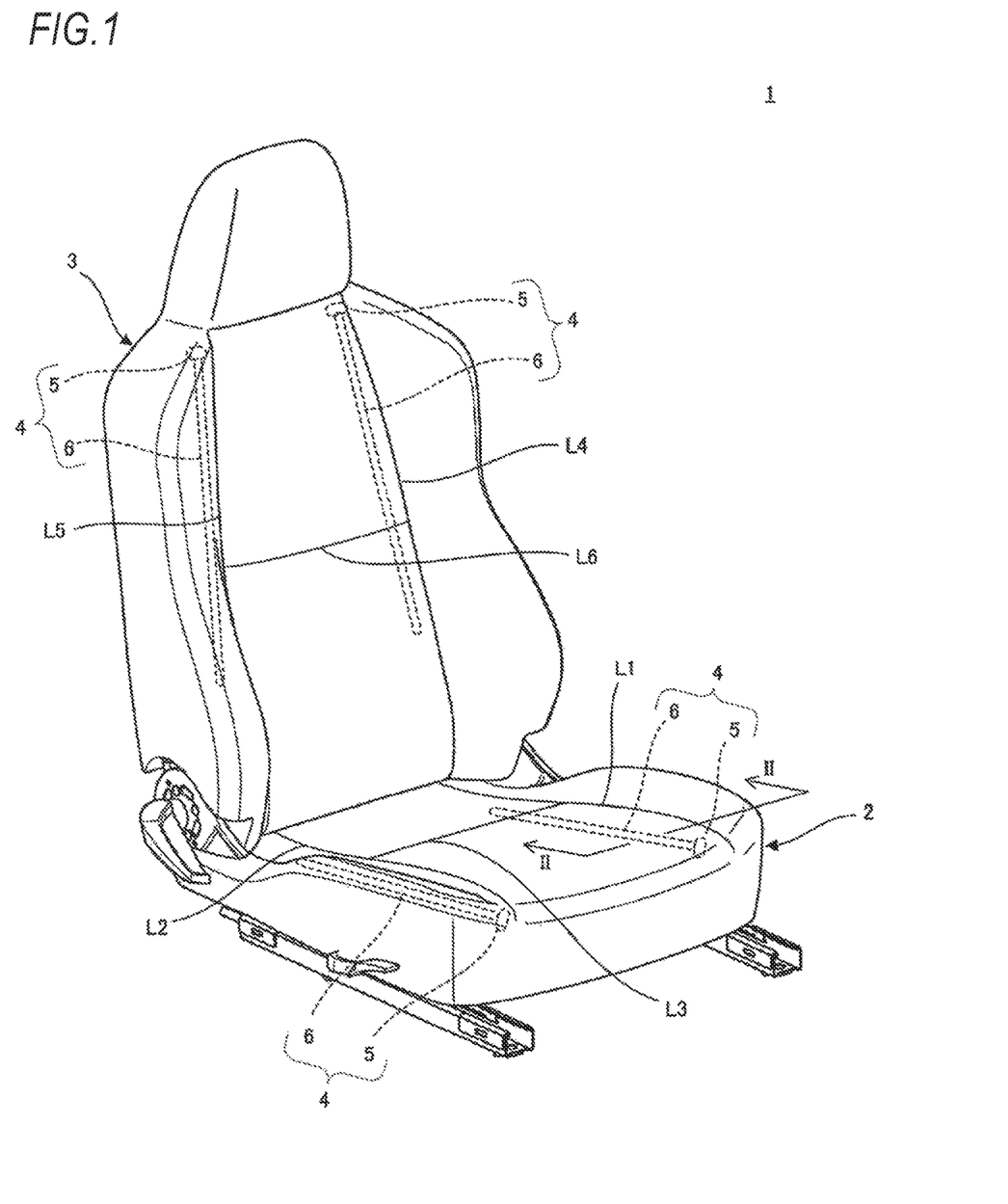
FIG. 1 is a perspective view illustrating one example of a vehicle seat for explaining an embodiment of the invention.

FIG. 1 is a perspective view illustrating one example of a vehicle seat for explaining an embodiment of the invention.

For example, a vehicle seat 1 illustrated in FIG. 1 is a seat which is provided in a vehicle such as an automobile. The vehicle seat 1 includes a seat cushion 2 which supports the hip and the thigh of an occupant (hereinafter, referred to as a sitting person) sitting on the seat 1, a seat back 3 which supports the lumbar and the back of the sitting person, and a plurality of vibration generating devices 4.

The seat cushion 2 has a cushion pad made of a foam material such as urethane foam and a trim cover which covers the cushion pad. With respect to a central portion in a seat width direction, the cushion pad of the seat cushion 2 is formed such that both side portions adjacent to the central portion in the seat width direction protrude to a sitting person side from the central portion. The trim cover of the seat cushion 2 is inserted into the cushion pad along hanging lines L1, L2, and L3. The hanging line L1 extends on the seat surface of the seat cushion 2 in a seat front-and-rear direction along a boundary between the central portion and one side portion of the cushion pad, and the hanging line L2 extends on the seat surface in the seat front-and-rear direction along a boundary between the central portion and the other side portion of the cushion pad. In addition, the hanging line L3 extends in the seat width direction on a substantially central portion of the seat surface in the seat front-and-rear direction.

The seat back 3 has a cushion pad and a trim cover which covers the cushion pad. With respect to the central portion in the seat width direction, the cushion pad of the seat back 3 is formed such that both side portions adjacent to the central portion in the seat width direction protrude to the sitting person side from the central portion. The trim cover of the seat back 3 is inserted into the cushion pad along hanging lines L4, L5, and L6. The hanging line L5 extends on the back rest surface of the seat back 3 in a seat vertical direction along a boundary between the central portion and one side portion of the cushion pad. The hanging line L5 extends on the back rest surface in the seat vertical direction along a boundary between the central portion and the other side portion of the cushion pad. In addition, the hanging line L6 extends on a substantially central portion of the back rest surface in the seat vertical direction in the seat width direction.

A vibration generating device 4 includes a vibration body 5 and a vibration transferring member 6 which is excited by the vibration body 5. In the illustrated example, two vibration generating devices 4 are provided in the seat cushion 2, and two vibration generating devices 4 are provided in the seat back 3. These vibration generating devices 4 transfer the vibration which one vibration generating device 4 alone generates or the vibration which the plurality of vibration generating devices 4 generate cooperative to the sitting person, thereby transferring various pieces of information to the sitting person.

In one vibration generating device 4 among two vibration generating devices 4 provided in the seat cushion 2, the vibration transferring member 6 is arranged along the hanging line L1 and extends in the seat front-and-rear direction. In the other vibration generating device 4, the vibration transferring member 6 is arranged along the hanging line L2, and extends in the seat front-and-rear direction. Further, all the vibration transferring members 6 are buried in the cushion pad of the seat cushion 2. The vibration body 5 is connected with one end of the vibration transferring member 6 and is provided in the end portion on the seat front side (and/or the end portion on the seat rear side) of the seat cushion 2. Incidentally, the vibration generating device 4 including the vibration transferring member 6 arranged along the hanging line L3 may be provided in the seat cushion 2, so as to be added to the two vibration generating devices 4 or to replace the two vibration generating devices 4.

In one vibration generating device 4 of two vibration generating devices 4 provided in the seat back 3, the vibration transferring member 6 is arranged along the hanging line L4 and extends in the seat vertical direction. In the other vibration generating device 4, the vibration transferring member 6 is arranged along the hanging line L5 and extends in the seat vertical direction. Further, all the vibration transferring members 6 are buried in the cushion pad of the seat back 3. The vibration body 5 is connected with one end of the vibration transferring member 6 and is provided in the end portion on the seat upper side (and/or the end portion on the seat lower side) of the seat back 3. Incidentally, the vibration generating device 4 including the vibration transferring member 6 arranged along the hanging line L6 may be provided in the seat back 3, so as to be added to the two vibration generating devices 4 or to replace the two vibration generating devices 4.

By the vibration transferring member 6 being buried in the cushion pad, the sense of irritation given to the sitting person is reduced compared to, for example a case where the vibration transferring member is provided between the cushion pad and the trim cover to be in contact with the trim cover. Incidentally, the vibration body 5 may be buried in the cushion pad, may be provided between the cushion pad and the trim cover, or may be provided to be exposed from the trim cover.

As the vibration body 5, a so-called eccentric motor can be used which generates a vibration by rotating a weight about a rotational axis deviated from the centroid of the weight. In addition, an exciter described in JP 2017-19386 A can be used for example.

When a simple description is given about the exciter, in the exciter, a voice coil is arranged in a magnetic circuit formed by a permanent magnet and a yoke, and an AC signal is supplied to the voice coil, so that the voice coil and a voice coil bobbin supporting the voice coil are vibrated at a frequency corresponding to the AC signal. The vibration is transferred to the vibration transferring member 6 to excite the vibration transferring member 6 in an extending direction of the vibration transferring member 6. According to the exciter, the vibration location on the vibration transferring member 6 can be changed in the extending direction of the vibration transferring member 6 in response to the frequency of the AC signal supplied to the voice coil, and various pieces of information can be transferred to the sitting person.

As the vibration transferring member 6, a rod-shaped member made of, for example a metal material can be used. However, as long as the vibration generated by the vibration body 5 is easily transferred, the material thereof is not limited. The sectional shape of the vibration transferring member 6 may be a polygonal shape such as a triangular shape and a quadrilateral shape. However, a circular shape is preferable from a viewpoint of reducing the sense of irritation given to the sitting person.

Figure 2:
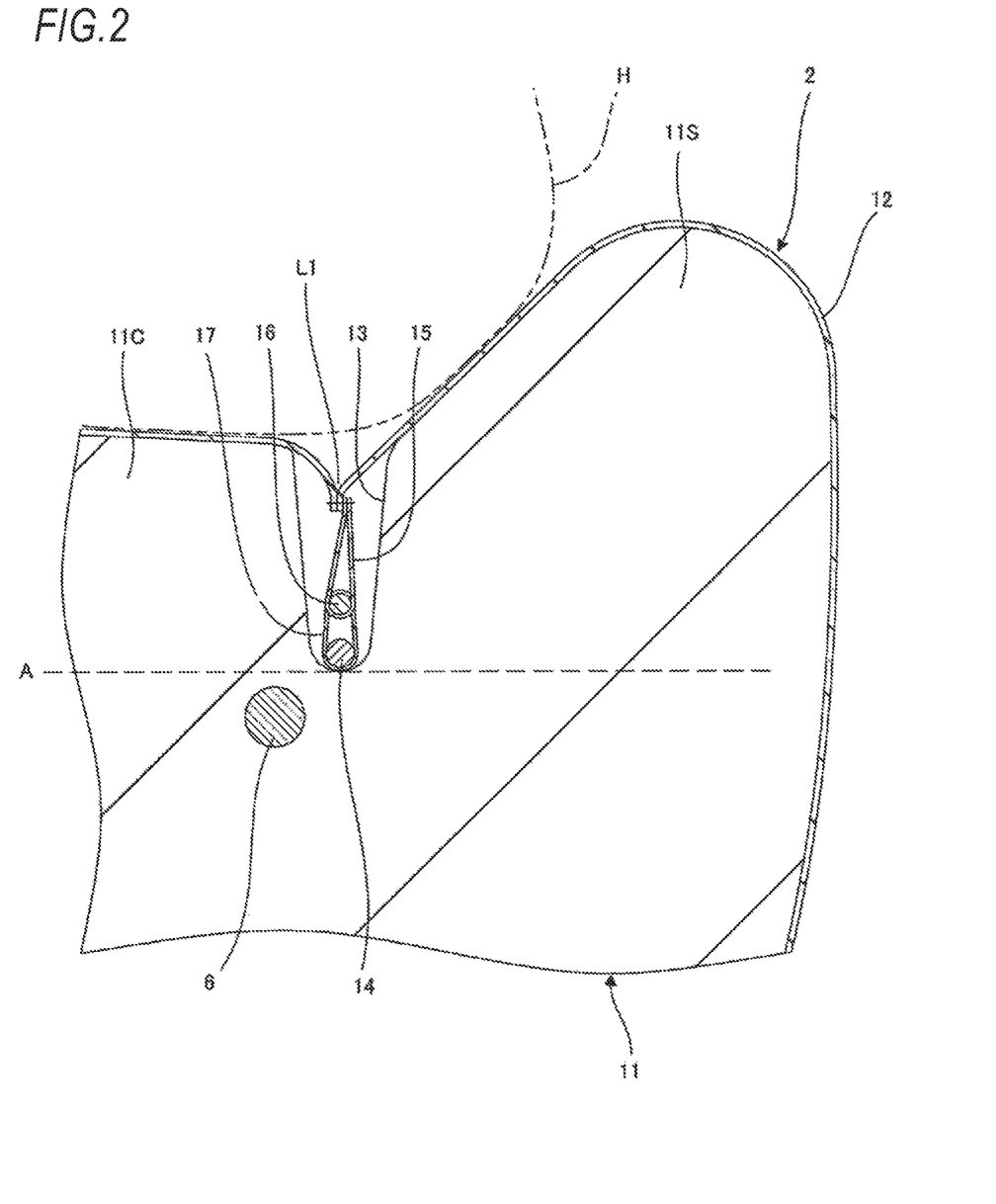
FIG. 2 is a sectional view taken along line II-II of FIG. 1 and is a sectional view illustrating an arrangement example of a vibration transferring member.

FIG. 2 illustrates a sectional surface of the seat cushion 2. Incidentally, FIG. 2 illustrates only the sectional surface on the hanging line L1 side on which the vibration transferring member 6 of one vibration generating device 4 of two vibration generating devices 4 of the seat cushion 2 is arranged. However, the same configuration also is applied to the hanging line L2 side on which the vibration transferring member 6 of the other vibration generating device 4 is arranged. In addition, the seat back 3 is also configured similarly.

As described above, the seat cushion 2 has a cushion pad 11 and a trim cover 12 which covers the cushion pad. With respect to a central portion 11C in the seat width direction, the cushion pad 11 is formed such that a side portion 11S adjacent to the central portion 11C in the seat width direction protrudes to the sitting person side from the central portion 11C.

A hanging groove 13 which extends along the hanging line L1 illustrated in FIG. 1 in the seat front-and-rear direction, that is, extends along the boundary between the central portion 11C and the side portion 11S of the cushion pad 11 is provided in a sitting-person supporting surface (the surface of the seat cushion 2 on the seat surface side) of the cushion pad 11. A pad-side wire 14 is arranged in the bottom of the hanging groove 13. The pad-side wire 14 is fixed in the cushion pad 11.

A hanging bag 15 is sewn to a portion overlapped with the hanging groove 13 in the back surface of the trim cover 12, and a cover-side wire 16 is inserted into the hanging bag 15. The cover-side wire 16 is bundled with the pad-side wire 14 by a hook ring 17, and is pulled in the hanging groove 13 by being bundled with the pad-side wire 14. Further, by the cover-side wire 16 being pulled in the hanging groove 13, the trim cover 12 is inserted into the hanging groove 13 to be stretched without being loosened.

The vibration transferring member 6 is buried in the cushion pad 11 and is arranged along the pad-side wire 14 arranged in the bottom of the hanging groove 13. The vibration transferring member 6 is, for example buried in the cushion pad 11 by insert-molding, or buried in the cushion pad 11 by being inserted into a receiving hole which is formed at the time of molding the cushion pad 11 or is formed by post-processing the molded cushion pad 11.

By the vibration transferring member 6 being arranged along the pad-side wire 14, the vibration of the vibration transferring member 6 is efficiently transferred to the pad-side wire 14. Further, the vibration which is transferred to the pad-side wire 14 is transferred to the cover-side wire 16 which is bundled with the pad-side wire 14, and is transferred to the trim cover 12 which is in contact with the sitting person. Accordingly, it is possible to excellently transfer the vibration to the sitting person.

Herein, the central portion 11C and the side portion 11S of the cushion pad 11 in contact with the hip and the thigh of a sitting person H are compressed by the load applied from the sitting person H to be hardened. On the other hand, the boundary portion between the central portion 11C and the side portion 11S, that is, the vicinity of the hanging groove 13 is recessed with respect to the periphery thereof, and the load applied from the sitting person H is relatively small and relatively soft. The vibration transferring member 6 is arranged along the hanging groove 13 which is provided in the boundary between the central portion 11C and the side portion 11S, so that first of all the sense of irritation given to the sitting person can be reduced effectively.

The vibration of the vibration transferring member 6 can be transferred to the sitting person H also by the propagation through the cushion pad 11. The central portion 11C and the side portion 11S are compressed to be hardened, so as to suppress that the central portion 11C and the side portion 11S absorb the vibration. Therefore, by the vibration transferring member 6 being arranged along the hanging groove 13 which is provided in the boundary between the central portion 11C and the side portion 11S, the vibration can be transferred more excellently to the sitting person through the central portion 11C and the side portion 11S of the periphery of the hanging groove 13.

Particularly, in the example illustrated in FIG. 2, the vibration transferring member 6 is provided at the position which is biased to the central portion 11C side of the cushion pad 11 with respect to the hanging groove 13, and is provided at the position further apart from the sitting-person supporting surface than the bottom of the hanging groove 13 (the position further apart from the sitting-person supporting surface than broken line A in the drawing) in the depth direction of the hanging groove 13.

If the vibration transferring member 6 is provided at the position closer to the sitting-person supporting surface than the bottom of the hanging groove 13, the vibration which is propagated through the side portion 11S takes a route which is curved in a U shape detouring the bottom of the hanging groove 13 to reach the side portion 11S. In contrast thereto, by the vibration transferring member 6 being provided at the position which is further apart from the sitting-person supporting surface than the bottom of the hanging groove 13, all the vibrations which are propagated through the central portion 11C and the side portion 11S take linear routes to reach the central portion 11C and the side portion 11S. Accordingly, the vibration can be transferred to the sitting person more excellently.

Incidentally, the vibration transferring member 6 may be provided at the position which is biased to the side portion 11S side with respect to the hanging groove 13. In that case, by the vibration transferring member 6 being provided at the position which is further apart from the sitting-person supporting surface than the bottom of the hanging groove 13, so that the vibration can be transferred to the sitting person more excellently.

Figure 3:
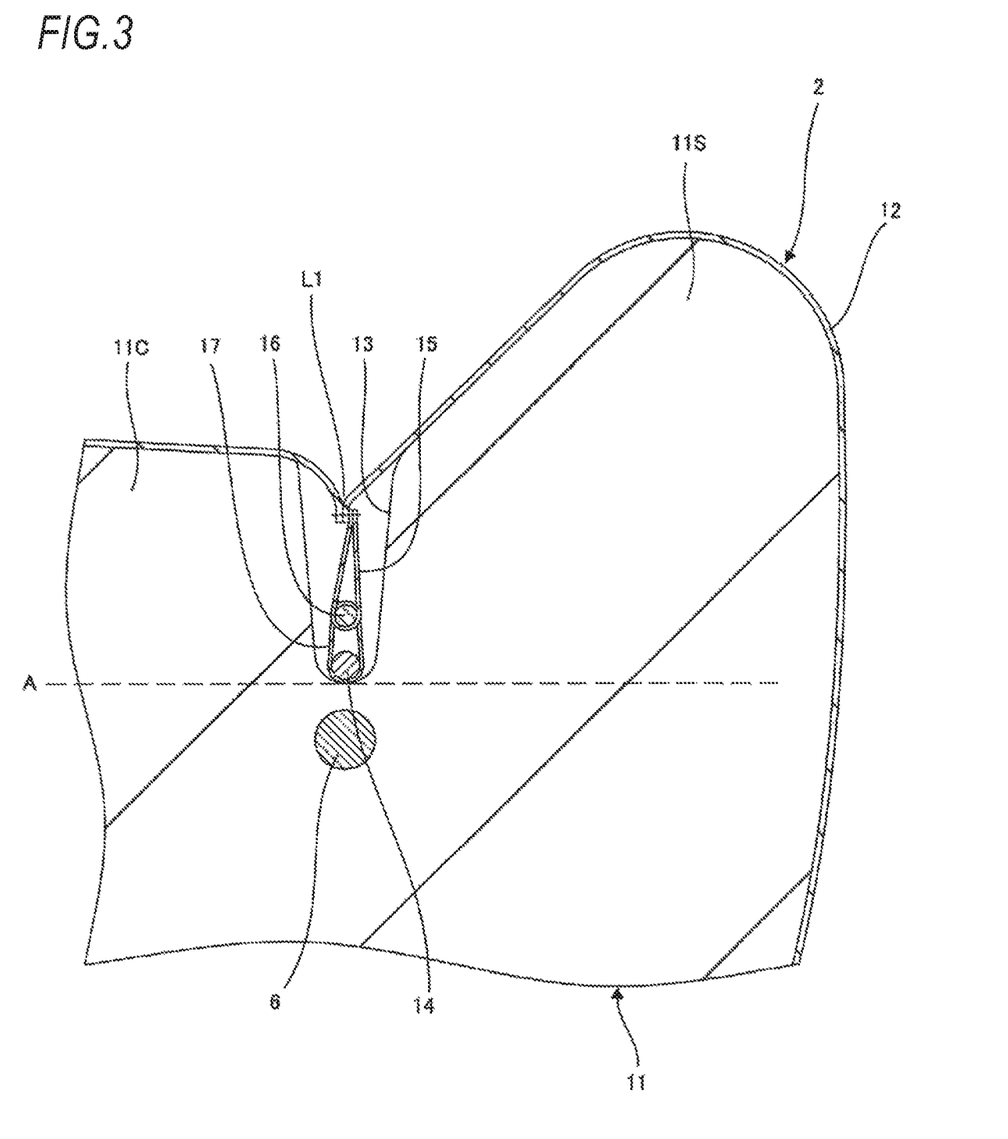
FIG. 3 is a sectional view illustrating another arrangement example of the vibration transferring member.

Preferably, as illustrated in FIG. 3, the vibration transferring member 6 is provided right below the bottom of the hanging groove 13 in the depth direction of the hanging groove 13. In that case, the vibrations of the vibration transferring member 6 are equally propagated through the central portion 11C and the side portion 11S of the cushion pad 11, so that the vibration can be transferred to the sitting person more excellently.

Figure 4:
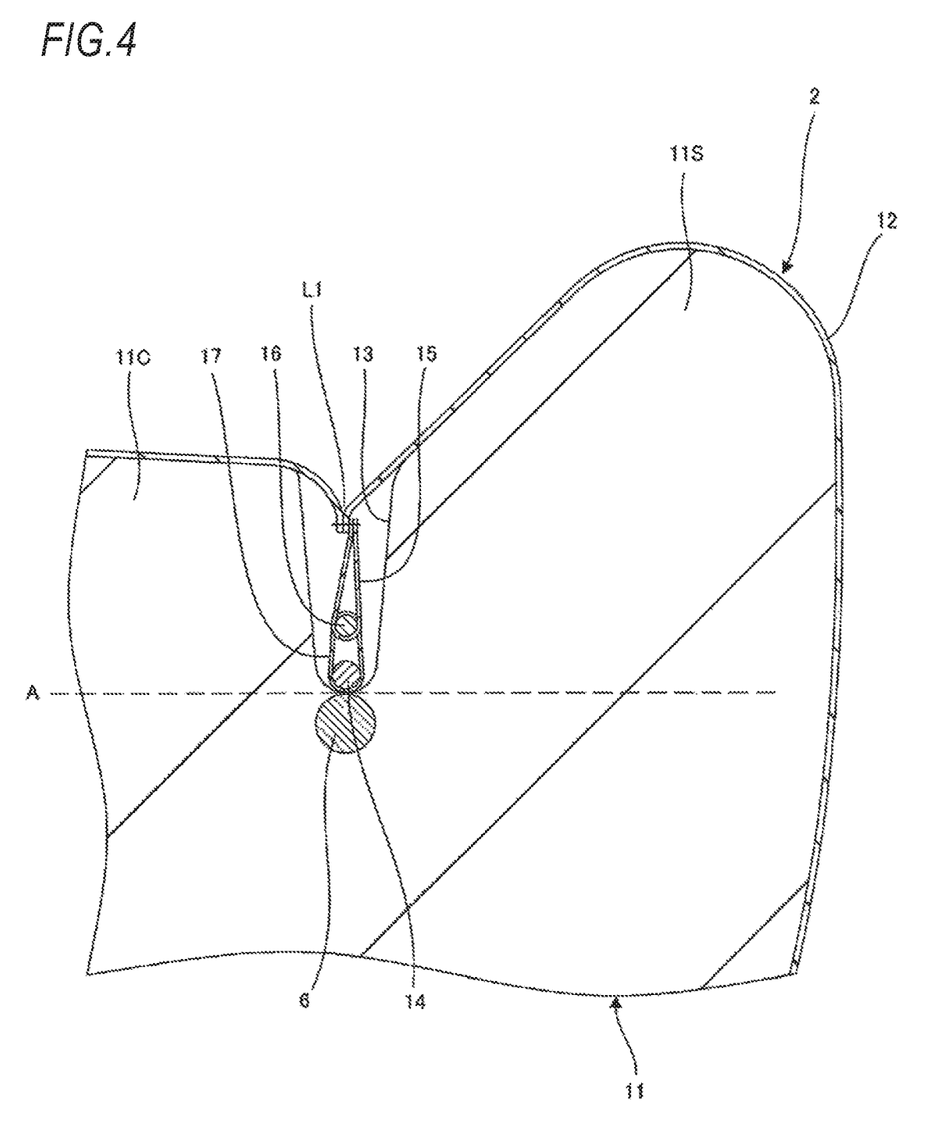
FIG. 4 is a sectional view illustrating still another arrangement example of the vibration transferring member.

More preferably, as illustrated in FIG. 4, the vibration transferring member 6 is provided adjacent to the pad-side wire 14 right below the bottom of the hanging groove 13. In that case, the vibration of the vibration transferring member 6 is directly transferred to the pad-side wire 14 not through the cushion pad 11, so that the vibration can be transferred to the sitting person more excellently.

Figure 5:
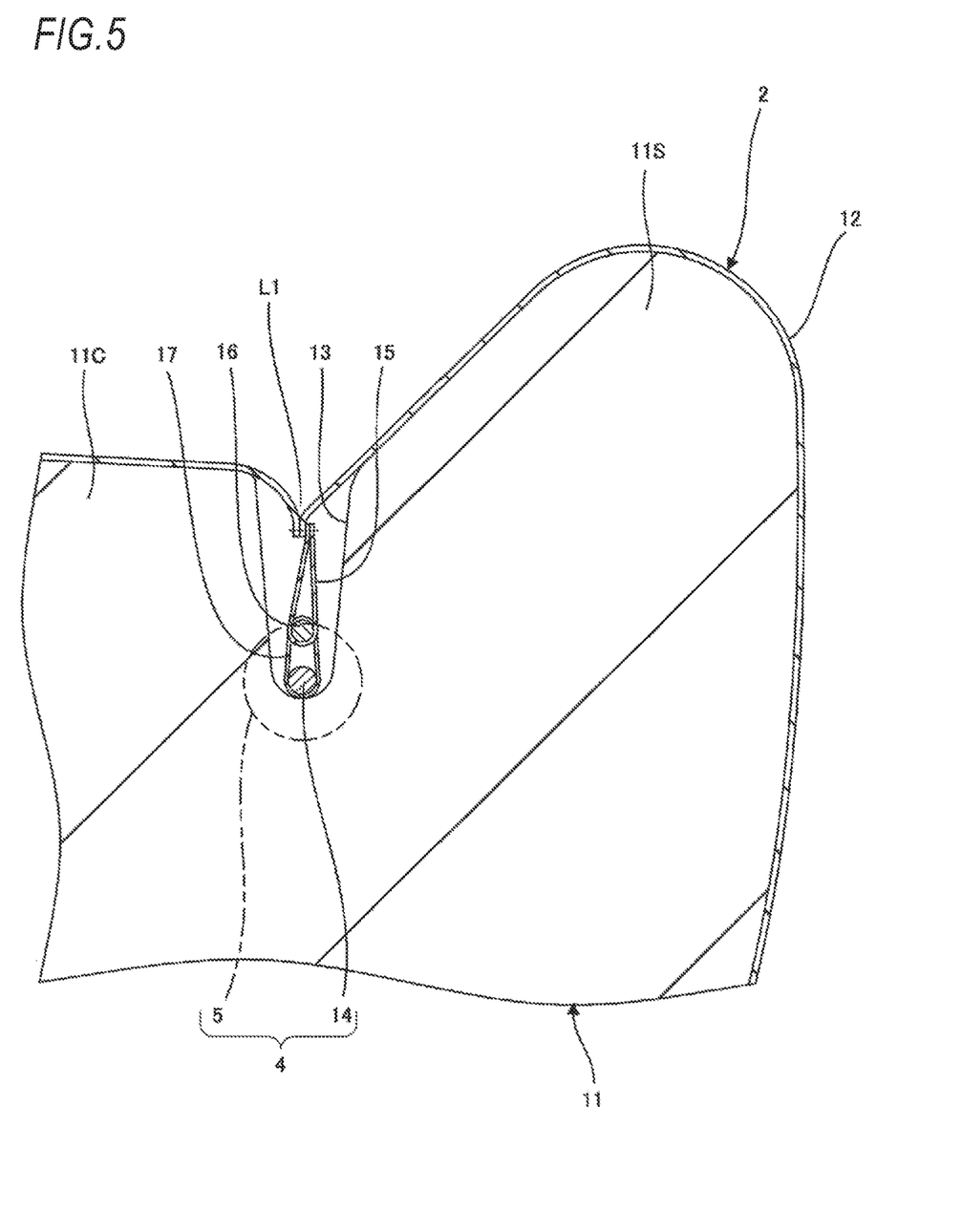
FIG. 5 is a sectional view illustrating a main part of another example of the vehicle seat for explaining the embodiment of the invention.

As illustrated in FIG. 5, by using the pad-side wire 14 as the vibration transferring member, the pad-side wire 14 can be excited directly by the vibration body 5. Accordingly, the vibration can be transferred to the sitting person more excellently, and further decrease in the number of components and the weight reduction can be achieved.

Next, the description will be given about the use example of the seat 1.

For example, the seat 1 can be used in a lane-departure prevention supporting system. The lane-departure prevention supporting system means a system that recognizes the traffic lane on the basis of the image on the vehicle front side and issues a warning to notify the occupant in a case where the vehicle leaves or is about to leave the traffic lane without operation of a direction indicator of the vehicle.

The vehicle front side is captured by the camera mounted in the vehicle, and the obtained image data is transmitted to the ECU (Electronic Control Unit) mounted in the vehicle. The ECU recognizes the traffic lane from the image data by using the well-known image recognition technology and determines whether the vehicle leaves or is about to leave the traffic lane. Further, in a case where the vehicle leaves or is about to leave the traffic lane, the ECU determines whether the vehicle leaves or is about to leave the traffic lane to the left side or leaves or is about to leave the traffic lane to the right side.

In a case where it is determined that the vehicle leaves or is about to leave the traffic lane to the left side, the ECU operates the vibration body 5 of the vibration generating device 4 on the left side (hanging line L1 side) among two vibration generating devices 4 provided in the seat cushion 2 of the seat 1 and/or operates the vibration body 5 of the vibration generating device 4 on the left side (hanging line L2 side) among two vibration generating devices 4 provided in the seat back 3. Accordingly, the vibration is transferred to the left side of the body of the sitting person to draw the sitting person's attention to the lane departure to the left side.

On the other hand, in a case where it is determined that the vehicle leaves or is about to leave the traffic lane to the right side, the ECU operates the vibration body 5 of the vibration generating device 4 on the right side (hanging line L2 side) among two vibration generating devices 4 provided in the seat cushion 2 of the seat 1 and/or operates the vibration body 5 of the vibration generating device 4 on the right side (hanging line L5 side) among two vibration generating devices 4 provided in the seat back 3. Accordingly, the vibration is transferred to the right side of the body of the sitting person to draw the sitting person's attention to the lane departure to the right side.

Incidentally, the seat 1 can be used in a system which notifies the occupant of the approach of the obstacle (such as another vehicle) on all four sides of the vehicle, a system which prevents the doze of the occupant, and the like.

Hereinbefore, the invention has been described by using the seat 1 provided in the vehicle such as the automobile as an example. However, the invention can be applied to a vehicle seat of a ship and an airplane other than the vehicle.

What is claimed is:

1. A vehicle seat comprising:
    a cushion pad in which one or more hanging grooves into which a trim cover is inserted are formed in a sitting-person supporting surface;
    a pad-side wire which is contactedly fixed to a bottom of the hanging groove of the cushion pad along the bottom of the hanging groove;
    a cover-side wire which is provided on the trim cover and bundled with the pad-side wire inside the hanging groove to lock the trim cover which is inserted into the hanging groove;
    a vibration transferring member which is buried in the cushion pad along the pad-side wire, the vibration transferring member being positioned directly below the pad-side wire and configured to extend lengthwise along a same direction as a lengthwise extending direction of the pad-side wire and hanging groove; and
    a vibration body which excites the vibration transferring member,
    wherein the vibration transferring member is provided at a position which is further apart from the sitting-person supporting surface than the bottom of the hanging groove in a depth direction of the hanging groove.

2. The vehicle seat according to claim 1, wherein
    the vibration transferring member is provided right below the bottom of the hanging groove in the depth direction of the hanging groove.

3. The vehicle seat according to claim 1, wherein the cushion pad includes a central portion in a seat width direction and a side portion that is adjacent to the central portion of the cushion pad in the seat width direction and protrudes beyond the central portion of the cushion pad at a sitting person side, and
    the pad-side wire and the hanging groove in which the pad-side wire is provided extend along a boundary between the central portion of the cushion pad and the side portion of the cushion pad.

4. The vehicle seat according to claim 1, wherein the vibration transferring member is positioned directly adjacent to the bottom of the hanging groove.

* * * * *